United States Patent [19]
Davis

[11] 3,829,125
[45] Aug. 13, 1974

[54] BICYCLE TRAILER
[75] Inventor: Ronald N. Davis, Stamford, Conn.
[73] Assignee: Cannondale Corporation, Stamford, Conn.
[22] Filed: June 20, 1973
[21] Appl. No.: 372,941

Related U.S. Application Data
[63] Continuation of Ser. No. 184,487, Sept. 28, 1971, abandoned.

[52] U.S. Cl............... 280/204, 280/47.26, 280/483, 280/492
[51] Int. Cl............................................. B62k 7/04
[58] Field of Search ........ 280/47.26, 204, 483, 485, 280/484, 492

[56] References Cited
UNITED STATES PATENTS
3,525,539  8/1970  Illar................................ 280/492 X FOREIGN PATENTS OR APPLICATIONS
322,858  8/1957  Switzerland........................ 280/204

Primary Examiner—Robert J. Spar
Assistant Examiner—George F. Abraham
Attorney, Agent, or Firm—Brumbaugh, Graves, Donohue & Raymond

[57] ABSTRACT

A small, light-weight two-wheel trailer for use with bicycles or for hand-towing comprises a tubular cargo body framework of unitary, generally rectangular members, a tongue composed of spaced tubular members and shaped to provide useful cargo space, and a hitch for connecting the trailer to a bicycle at a tow point in the region of the seat post. A device acting between the bicycle and the trailer provides resilient restraint that prevents accidental lateral upsetting of the trailer.

5 Claims, 10 Drawing Figures

PATENTED AUG 13 1974  3,829,125

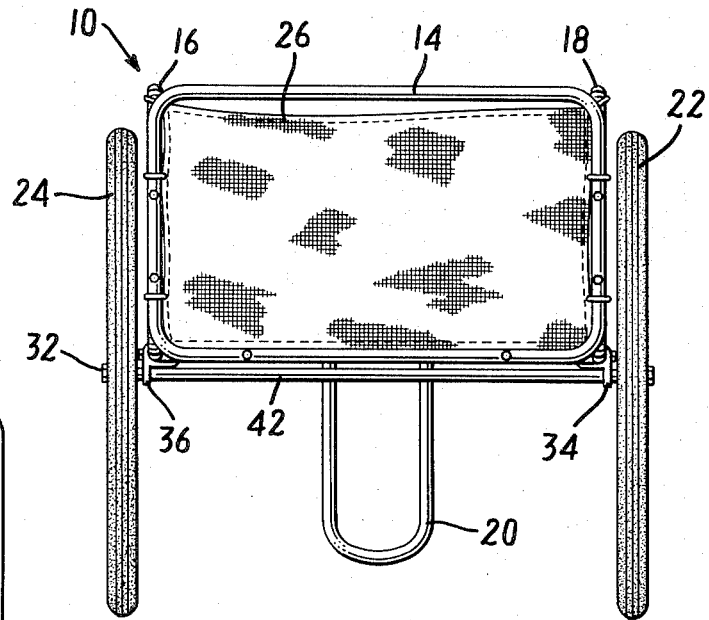
FIG. 3
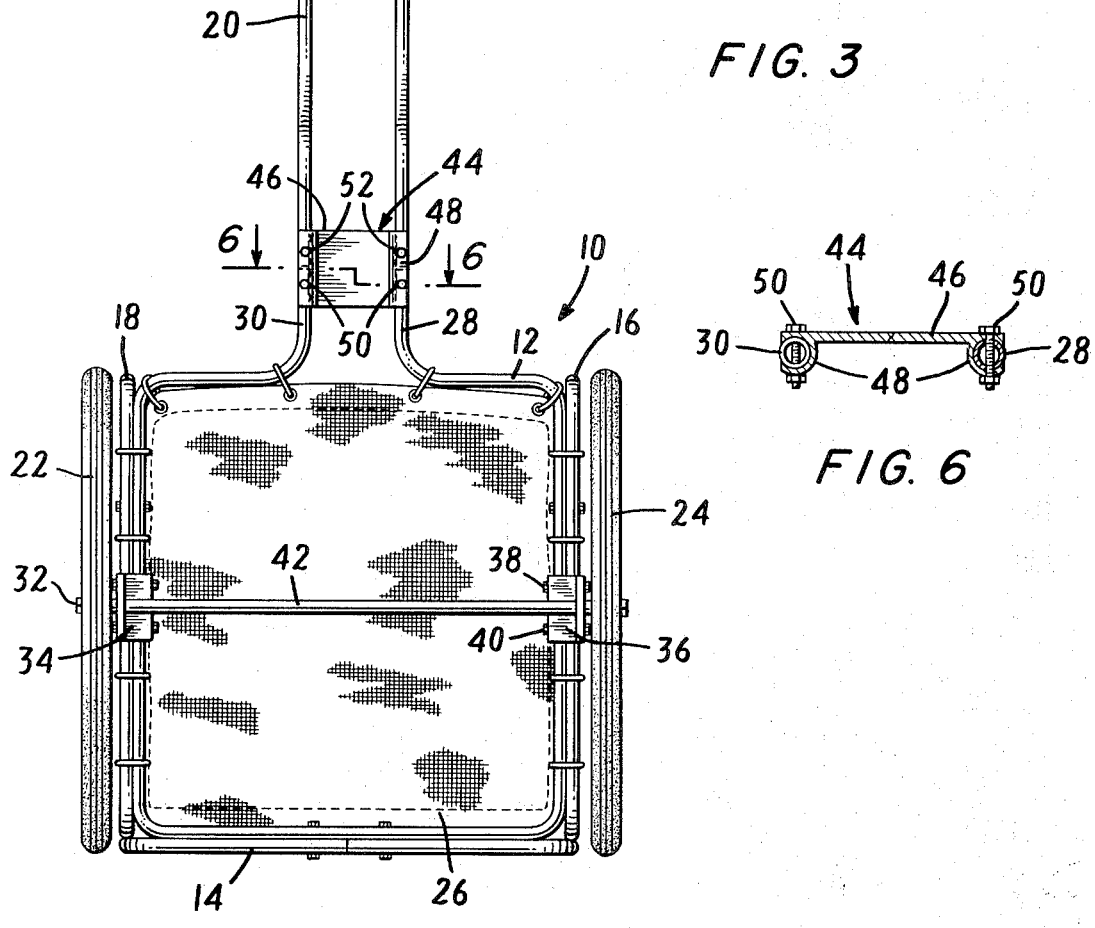
FIG. 4
FIG. 6

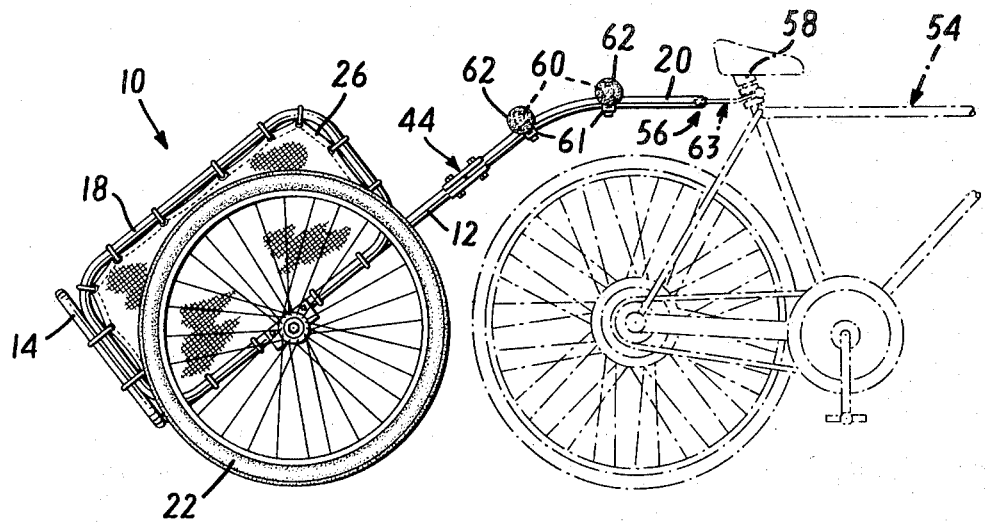
FIG. 5
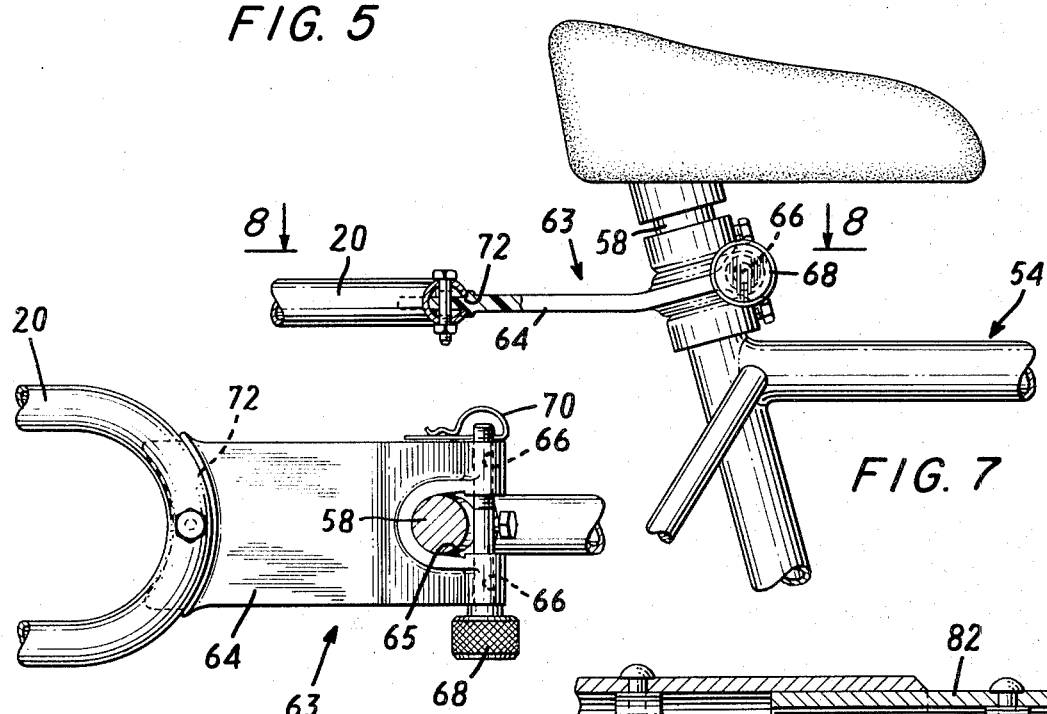
FIG. 7
FIG. 8
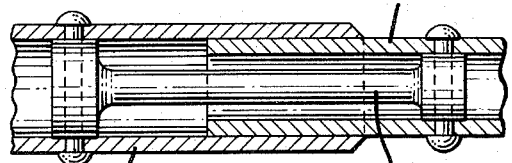
FIG. 9
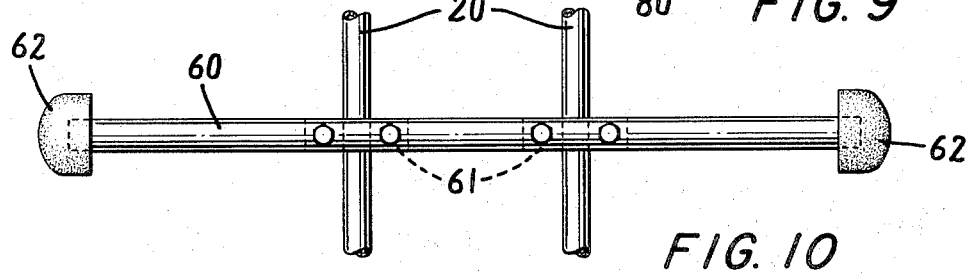
FIG. 10

BICYCLE TRAILER

This is a continuation of U.S. Pat. application Ser. No. 184,487 filed Sept. 28, 1971.

BACKGROUND OF THE INVENTION

This invention relates to a small, two-wheel, light-weight trailer and, more particularly, to a trailer for use with bicycles.

The bicycle is probably one of the most popular recreational and useful devices ever invented. The first "walk-along" bicycle was created in about 1790. It appears that the first patent on a bicycle was granted in 1866 to a Frenchman for a pedal bicycle appropriately called the "Boneshaker." By the end of the nineteenth Century bicycles had been significantly improved by the addition of coaster brakes, adjustable handle bars, and pneumatic tires, and there were about four million bicycles in the United States. It is estimated that there are about fifty million bicycles in the United States today; it is impossible to even guess at the number of bicycles in use world-wide.

Until relatively recently, the use of bicycles in the United States over the last few decades has been almost exclusively by children for recreation and local transportation; out automobile-based society has virtually excluded bicycles as a recreational or useful vehicle for adults. Within the last few years, however, several factors have led to a tremendous increase in the use of bicycles in the United States. Among those factors are the following: an increasing concern for good health through exercise; an urge to get away from the paved and smogged-over urban areas and back to nature; a concern for air pollution caused by motor vehicles; and the cost of running, garaging, and operating automobiles, especially in cities. At present it is estimated that the United States public is now purchasing bicycles at a rate of about 8,000,000 per year.

One problem that tends to diminish the usefulness of bicycles is their limited ability to carry anything other than the rider. Although various types of bicycle baskets are available, they provide only limited capacity. Accordingly, many bicycle riders have resorted to the use of back-packs, particularly for bicycle camping which is becoming increasingly popular. Among the problems with the use of back-packs are the weight and space limitations and the increased difficulties in riding a bicycle with a heavy back-pack; inasmuch as the weight of the back-pack is high above ground, bicycle riding with a back-pack is not only difficult, but can be dangerous.

From time to time there have been various proposals for bicycle trailers, but none is believed to have gained any significant consumer acceptance and use. Trailers for use with bicycles proposed heretofore have been rather cumbersome in size and of substantial weight. Despite the size and weight, the cargo carrying capacity of many versions has been quite limited. The trailers have often employed elaborate hitch attachments for connecting them to the bicycle, with the consequent installation problems that tend to discourage a prospective user. The construction and the manner of attachment to the bicycle of some of the proposed trailers leave considerable doubt as to their stability against tipping over and the accompanying risk to the rider of a spill.

SUMMARY OF THE INVENTION

There is provided, in accordance with the present invention, a small, light-weight, two-wheel trailer for use with bicycles and similar vehicles. The trailer provides an excellent solution to the limited load carrying ability of the conventional bicycle and previously proposed trailers.

The trailer, in accordance with the invention, comprises a body that provides cargo space, a pair of rotatable wheels, one disposed on each side of the body, and an elongated tongue connected to and extending forward from the body, and constructed to provide additional carrying space. In this regard, a preferred form of the trailer involves the dimensioning, shaping and construction of the tongue so that it extends along an inclined curve from the body to a tow point on the bicycle located in the region of the seat post. Preferably, the tongue is composed of spaced-apart bar members and provides, first a relatively long distance between the tow point and the trailer wheels while still allowing the trailer body to ride very close, say as little as one inch, behind the bicycle and second, a support structure for cargo. The first point means that the trailer can track smoothly behind the bicycle through turns without generating sharp angles between the longitudinal axis of the bicycle and longitudinal axis of the trailer. This advantage is afforded, nonetheless, without increasing the overall length of the trailer-bicycle assembly to an undesirable or impractical extent. The two-bar constitutes useful carrying space that permits the trailer to be loaded along its entire length from the rear of the body up to the tow point and the front end of the tongue.

The invention also provides an effective solution for another problem inherent in any small, light-weight, two-wheel vehicle, namely that of the vehicle tipping over laterally. Provision is made for a resilient restraint acting between the trailer and the bicycle; preferably, the resilient restraint is afforded by the form of hitch by which the trailer tongue is connected to the bicycle. It is apparent that this feature of the invention affords the same advantages of preventing tipping, regardless of the particular design of the trailer. A preferred form of hitch includes a flat strip of resilient material rigidly attached at one end to the trailer tongue and attached at the other end to the bicycle for rotation about a generally vertical axis and against rotation about any other axis.

DESCRIPTION OF THE DRAWINGS

For a better understanding of further features and advantages of the invention, references may be made to the following description of an exemplary embodiment, taken in conjunction with the figures of the accompanying drawings, in which:

FIG. 3 is a back elevational view of the embodiment;

FIG. 4 is a bottom elevational view of the embodiment;

FIG. 5 is a side elevational view of the embodiment showing it attached to a bicycle;

FIG. 6 is a view in cross-section taken generally along the line 6—6 and in the direction of the arrows in FIG. 4 showing a connector by which the trailer tongue is attached to the body, the view being on a larger scale than FIG. 4;

FIG. 7 is a side elevational view of one form of trailer hitch by which the trailer is attached to the bicycle;

FIG. 8 is a top view of the trailer hitch of FIG. 7;

FIG. 9 is a detail view in cross-section of a device for stabilizing a small, lightweight trailer; and FIG. 10 is a top view of an accessory cargo mounting bar, one or more of which may, if desired, be mounted on the trailer tongue.

DESCRIPTION OF EXEMPLARY EMBODIMENTS

Figure 1:
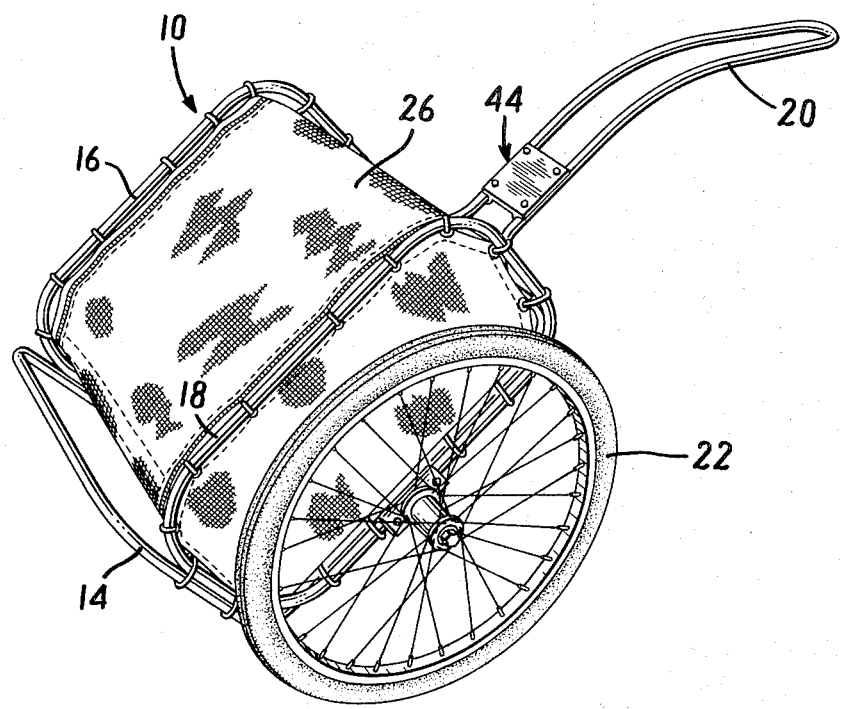
FIG. 1 is a pictorial view of the embodiment, the view being taken from a point above and slightly behind the trailer.
Figure 2:
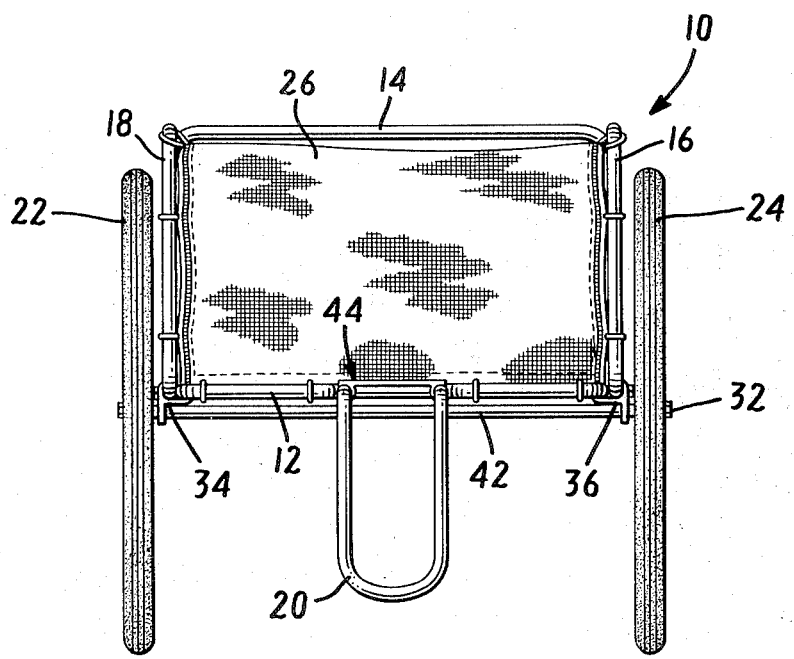
FIG. 2 is a front elevational view of the embodiment.

Referring first to FIGS. 1 to 4, the general overall construction of the trailer involves a trailer body, which is designated generally by the reference numeral 10 composed of a framework of tubular members, namely a base member 12, a back member 14, and two side members 16 and 18, a tongue 20 that is attached to and extends forward from the base member of the body 10, a pair of wheels 22 and 24, one mounted on each side of the body, and a fabric cargo bar 26 nested in the cargo space defined within the framework of the cargo body 10 and secured to the frame members. The cargo bag 26 may be of any appropriate construction and is, therefore, not described in detail herein.

More particularly, each of the members making up the body framework is, in the embodiment, made by bending tubing into a generally rectangular loop, thereby providing a one-piece peripheral frame component having ends butting to close the loop, except for the base (see below). Although various materials can be employed, it is preferable to use chrome-plated or bright zinc-plated steels, which offer the advantages of high strength and durability, relatively light weight for their strength, and corrosion resistance. They are also esthetically attractive materials.

From FIG. 4 it is evident that the base member 12 of the body 10 is substantially square in plan and is formed with a pair of spaced apart legs 28 and 30 that extend forward from the front of the body and are located in the same plane as the major portion of the member 12. While it will be readily apparent to those skilled in the art that the dimensions of the various members can vary widely, in accordance with various use requirements for which the trailer is intended, the cost of fabricating the trailer can be reduced by constructing the back member 14 and the two side frame members 16 and 18 to identical sizes and shapes. In the embodiment, the members 14, 16 and 18, accordingly, are generally rectangular in plan, and each is formed by bending a single piece of tubing into a closed loop. Preferably, the ends of the tubular members meet near bottom center in each instance.

As illustrated in the drawings, the four members making up the cargo body 10 of the trailer are joined together, such as by bolting at appropriate locations. Each of the members is pre-punched with holes for that purpose. In particular, the back frame member 14 is attached to the back portion of each of the two side members and to the back portion of the bottom frame member. In addition, the side frame members 16 and 18 are attached to the corresponding side portions of the bottom frame member 12.

The wheels 22 and 24 are mounted on the body for rotation on an axle 32 that extends entirely across the width of the trailer body and extends out at each side a sufficient distance to accommodate the wheel bearings and retainer nuts. The axle is received on a pair of mounting brackets 34 and 36 bolted to opposite sides of the base portion of the trailer body. Each bracket 34 and 36 includes a generally "U" shaped portion providing spaced-apart flanges, the inner one of which is received inside of the side leg of the base frame member and the outer one of which is received on the outside of the bottom leg of the respective side frame member. Bolts, for example, 38 and 40 in FIG. 4, extend through the flanges and through the portions of the frame members captured between the flanges firmly to secure the respective bracket to the body frame 12. A downwardly extending flange on each bracket has a hole that receives the axle, and the assembly is further rigidified and strengthened by a tubular spacer 42 that extends across between the inside faces of the respective axle mounting flange portions of each bracket. The wheels 22 and 24 of the trailer are of the conventional spoked bicycle-type, preferably with pneumatic tires, and they are mounted for rotation on the axle by conventional bearings.

The trailer tongue 20 is a piece bent from the same tubing material as the frame members. It is generally "U"-shaped in plan and curves generally smoothly from back to front in a downward direction, relative to the plane of the base of the trailer body 10. The back ends of the two spaced-apart tongue legs meet the forwardly extending legs 28 and 30 of the bottom frame member 12 of the body 10 and are joined to them by a connector 44, which is shown in detail in FIG. 6. The connector 44 includes a web portion 46 and a pair of curved flanges 48 at opposite sides of the web portion, each of which defines a circular (in cross-section) slot having an internal diameter substantially equal to the outside diameter of the tubular members of the frame and tongue. The connector 44 is preferably formed by cutting a piece of appropriate width from a continuous extrusion having the appropriate cross-sectional shape and dimensions. The tongue is secured to the trailer body by sliding the connector 44 endwise onto the forwardly extending legs 28 and 30 of the bottom frame member 12, installing bolts 50 to secure the connector to the trailer body, sliding the tongue into the flanges of the connector and then installing the bolts 52. It is apparent that the connector provides a rigid, durable connection between the trailer and the tongue, inasmuch as the tubular members are confined and captured within the matching slots at each side of the connector. The web portion 46 of the connector provides a convenient place for the name and any other identifying data for the trailer such as a serial number, load capacity, tire pressure and similar information.

Referring next to FIG. 5, the trailer is attached to a bicycle, which illustrated in phantom lines and designated generally by the reference numeral 54, by a hitch 56 connected to the tongue of the trailer and to the seat post 58 of the bicycle. The use of a tow point in the region of the bicycle seat offers several advantages. For one thing, it permits a relatively long length between the tow point and the axle of the trailer, which in turn allows the trailer to track smoothly behind the bicycle, rather than weaving back and forth, as the bicycle negotiates turns and provides the generation of only relatively small angles between the axis of the bicycle and the axis of the trailer. Nonetheless, the body of the trailer tracks relatively close behind the bicycle so that the overall length of the trailer and bicycle is kept to a minimum. The tow point is also forward of the axle of the rear wheel of the bicycle so that the tongue load of the trailer is between bicycle wheels and adds to, rather than subtracting from, (assuming a positive tongue load) the front wheel load on the bicycle; in other words, the trailer does not tend to lift the front wheel of the bicycle off the ground.

It is apparent from FIG. 5 of the drawings that the configuration of the trailer provides for a relatively flat cargo zone extending not only within the body of the trailer but along the tongue. This configuration of the trailer, together with the construction of the tongue with spaced-apart bars, permits the trailer to be loaded not only at the body but substantially along the entire length of the trailer. As an optional feature, one or more transverse bars 60 (see FIG. 10) can be secured, such as by conventional clamps 61, to the tongue of the trailer at appropriate locations to enhance the facility with which cargo can be supported on the tongue. Rubber or plastic knobs 62 are installed at the ends of the bars 60 for protection.

As already discussed briefly, an important feature of the invention is the provision of a device for restraining the trailer against any tendency to tip laterally. For example, the rider may not make a sufficiently wide turn around a corner which could result in one wheel running up over a curb. Because of the pneumatic tires and the relatively lightweight of the trailer, the change of upsetting the trailer is not insignificant, and there is a significant need for restraint against possible upset.

One form of restraining arrangement is provided in conjunction with the trailer hitch and is illustrated in detail in FIGS. 7 and 8. The hitch 63 of FIGS. 7 and 8 is a strip or plate of resilient material that is rigidly secured at one end to the tongue of the trailer and is secured for rotation about a generally vertical axis to the seat post but so mounted so as to preclude any significant rotation about any other axis. Although various resilient materials can be employed, excellent results have been obtained with a resilient plastic material available from the General Electric Company under the trademark LEXAN. This material has excellent properties of resilience, toughness, strength and durability and is readily molded or cut to a desired shape and size. Of particular significance is the modulus of elasticity of LEXAN, which is about 320,000 psi, since that property represents a resilience effective to provide substantial restraint against lateral tipping of the trailer.

In the embodiment of FIGS. 7 and 8, the hitch 63 is a molded piece of the resilient material having a body portion 64 of generally rectangular shape in plan and formed at the front edge with an enlargement that includes a "U" shaped slot 65 open at the front and having a width slightly larger than the outside diameter of the bicycle seat post and transverse, aligned bores 66 in each leg forward and to the either side of the slot 65. The slot 65 receives the seat post 58 with the base of the slot "U" closely matching the post cross-section. A pin 68 is pushed through the aligned bores 66, which are in front of the seat post, thus retaining the hitch on the seat post, the pin 68 having an easy-release type cotter pin 70 to retain it in the bores 66.

Suitable clamps can be installed on the post to keep the hitch in the desired vertical location on the post; usually the hitch will rest on top of the seat post clamp collar. The fit of this connection is such as to allow free pivoting of the hitch on the post, thus providing a generally vertical pivot axis for articulation of the trailer in a generally horizontal plane. It is evident that the hitch is easily connected or disconnected from the bicycle by installing or removing the pin 68 so that the trailer can be unhitched or hitched up to the bicycle without the use of any tools very quickly and easily.

Although various forms of rigid connection between the tongue and the hitch will be readily evident to one skilled in the art, the form illustrated in the drawing involves the formation of a slot 72 in the front of the forward end of the trailer tongue and the shaping of the back of the hitch to match the shape of the tongue. The back end of the hitch is inserted into the slot, and a bolt is installed through the tongue and through the portion of the hitch received inside the tubing (see FIG. 7).

It is evident from the foregoing, and indeed from consideration of FIGS. 7 and 8 of the drawing, that the hitch provides for rotation of the hitch and articulation of the trailer relative to the bicycle about a generally vertical axis, namely the axis of the bicycle seat post.

However, the rotation of the hitch in any direction about any axis other than the axis of the seat post is substantially precluded. Accordingly, any tendency for the trailer to tip relative to the bicycle is inhibited by the inherent resiliency of the hitch. Such resilient force reaction to any such tendency for the trailer to tip over is increased with increasing angles between the plane of the forward end of the tongue and a plane perpendicular to the axis of the bicycle seat post. In other words, the greater the tendency for the trailer to tip over laterally the greater is the restraining force exerted on the trailer tending to right it. Nonetheless, the resilient member permits relative tilting between the trailer and the bicycle in the lateral direction, and experience has demonstrated that the resilient hitch does not materially inhibit the maneuverability of the bicycle nor does it prevent the trailer from easily tracking up and down or side to side in accordance with variations in the ground surface. Accordingly, the bicycle can easily be leaned going around turns, and the trailer will track nicely behind the bicycle even over uneven terrain.

Inasmuch as the resilient strip 64 is preferably initially flat, it is apparent, particularly from FIGS. 5 and 7 of the drawings, that the resilient strip is normally under a pre-load condition tending to push the tongue of the trailer downwardly as a result of the axis of the seat post being at a slight angle to the vertical. This pre-load has been found to have little effect on the operating characteristics of the bicycle-trailer system. Though it tends to inhibit bouncing of the trailer by adding a downward component to the effective trailer load, the extend of the pre-load of the resilient strip is rather modest, and it provides only a limited downward force effect on the trailer because of the relationship of the moment distances involved, i.e., limited leverage.

FIG. 9 of the drawings illustrates another appropriate form of device for providing a resilient restraint acting between the trailer and bicycle for preventing lateral upsetting of the trailer. It also is a part of a hitch arrangement. It comprises two tubular members 80 and 82 of circular cross-section and dimensioned to be telescoped together. One of the members is attached by a suitable coupling (not shown), many forms of which are well known to those skilled in the art, to the bicycle tow point for rotation about (1) a generally vertical axis and (2) a generally horizontal and transverse axis, so that the trailer can articulate from side to side (in the horizontal plane) to track behind the bicycle and can articulate up and down (in the vertical plane). The other member is rigidly secured to the trailer tongue.

It may be noted here that any hitch between the bicycle and the trailer can be rigidly secured to the bicycle and coupled to the trailer for appropriate articulation. However, it is preferable, as in the embodiments, to provide articulation at the bicycle tow point to maximize the distance between the bicycle tow point and the trailer wheels and smooth out the tracking action.

A torsion member 84 is installed within the two telescoped tubes 80 and 82, and the respective ends of the torsion member 84 are connected to the respective tubes. In the embodiment, the torsion member is a circular (in cross-section) bar having appropriate diameter and effective length to provide the desired restraint against relative twisting of the tubing members 80 and 82. Each end of the bar is enlarged to match the internal diameter of the respective tubing member and is formed with a bore that receives a bolt or rivet. It is evident that the torsion member 84 resiliently restrains relative rotation of the two tubing members 80 and 82 with a torque that increases with increasing magnitude of relative twist in either direction for the neutral position. Consequently, the device of FIG. 9 resiliently restrains the trailer from lateral upset to an extent that is a function of the degree of relative tipping of the trailer; the device functions in a manner very similar to the embodiment of FIGS. 7 and 8.

Thus, there is provided, in accordance with the invention, a lightweight, durable bicycle trailer of relatively simple construction. The trailer is very easy to attach to a bicycle and has a large load-carrying capability for its size and weight. Unlike previously proposed bicycle trailers, it has provision for resilient restraint against lateral upset, something that has been particularly troublesome heretofore.

One point that has not previously been mentioned is that the configuration of the trailer body, wheels, and tongue allows the trailer, when unhitched from the bicycle, to rest on the ground with the cargo body substantially parallel to the ground. This feature facilitates loading and unloading the trailer, particularly when loose materials are placed in the cargo bag in the trailer body; there is no tendency for loose contents to fall out of the cargo bag with the trailer unhitched and resting on the ground. The configuration of the trailer body and hitch also enhances the versatility of the trailer; in this respect, the trailer can conveniently be towed by hand in substantially the same orientation as illustrated in FIG. 5. The front end of the tongue provides a convenient hand hold for pulling the trailer by hand behind the user, thus the trailer can be used as a shopping cart, a golf cart, or for other general purposes and is by no means restricted to use as a bicycle trailer. For use as a golf bag cart, an accessory rubber bumper pad or the like could be attached to the back frame member 14 so that the trailer would stand at a slightly forwardly inclined angle when the cart is at rest.

The above described embodiment of the invention is intended to be merely exemplary, and numerous variations and mofications of it will be readily apparent to those skilled in the art without departing from the spirit and scope of the invention. All such variations and modifications are intended to be included within the scope of the invention, as defined in the appended claims.

We claim:

1. A trailer for bicycles and similar vehicles comprising a body having a frame system composed of members forming the perimeters of a bottom, two sides and a back, a pair of rotatable wheels, one disposed on each side of the body, an elongated tongue connected to and extending forward from the body and composed of a pair of laterally spaced-apart bar members adapted to support a cargo, the rear portion of the tongue being generally contiguous to and coplanar with the bottom frame member of the body and the front portion of the tongue curving smoothly downwardly and forwardly relative to the rear portion such that the bottom frame member and the rear portion of the tongue are inclined at a moderate slope to the horizontal when the trailer is hitched to the vehicle on level ground, whereby the tongue is adapted to support cargo and provide an extension of the cargo space provided by the body, and hitch means for connecting the forward end of the tongue to the bicycle at a tow point on the bicycle located in the region of the bicycle seat post.

2. A trailer according to claim 1 and further comprising means associated between the trailer and the bicycle for resiliently restraining the trailer from tipping laterally relative to the bicycle.

3. A trailer according to claim 2 wherein the restraining means is included in the hitch means.

4. A trailer according to claim 3 wherein the hitch means includes a member of resilient material rigidly connected adjacent one end of the end of the trailer tongue and connected adjacent its end opposite said one end to the bicycle hitch point for pivotal movement of the tongue about a generally vertical axis and for restraint against pivotal movement of the tongue relative to the bicycle about any axis other than said generally vertical axis.

5. A trailer for bicycles and similar vehicles comprising a body, at least one pair of rotatable wheels, one wheel of each pair being disposed on each side of the body, an elongated tongue extending forward of the body and hitch means for connecting the trailer tongue to the bicycle to afford articulation between the bicycle and the tongue in a substantially horizontal plane, the hitch means including a torsion member interposed between the bicycle and the trailer and providing an increasing restraint against relative lateral tipping between the trailer and bicycle as the degree of such relative tipping increases in the form of a strip of resilient material having a modulus of elasticity of on the order of 320,000 psi and rigidly connected adjacent one end to the end of the trailer tongue and connected adjacent its end opposite from said one end to the bicycle at a hitch point thereon in the region of the bicycle seat post for pivotal movement about a generally vertical axis and for restraint against pivotal movement of the tongue relative to the bicycle about any axis other than said generally vertical axis.

* * * * *